INVENTORS
PIERRE REGNAULD &
BORIS BOGATENKOFF

July 28, 1959 P. REGNAULD ET AL 2,897,343
METHOD AND APPARATUS FOR AUTOMATIC ARC WELDING
WITH A FUSIBLE ELECTRODE
Filed Oct. 4, 1956 2 Sheets-Sheet 2
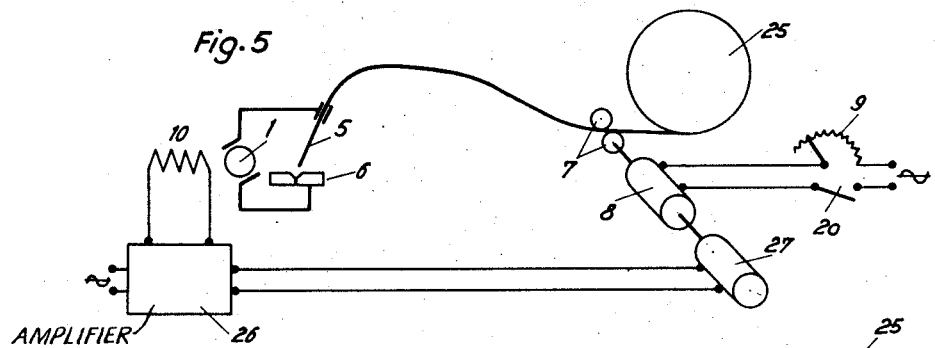
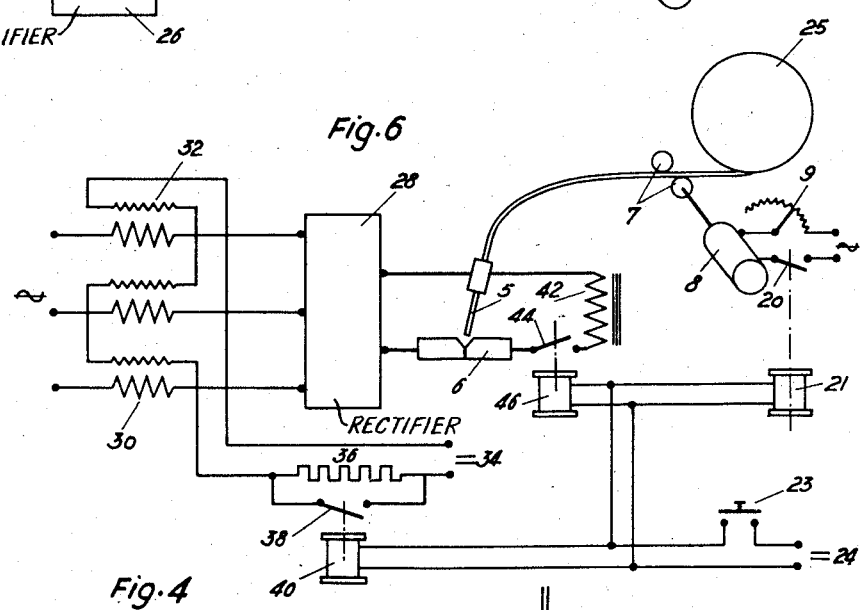
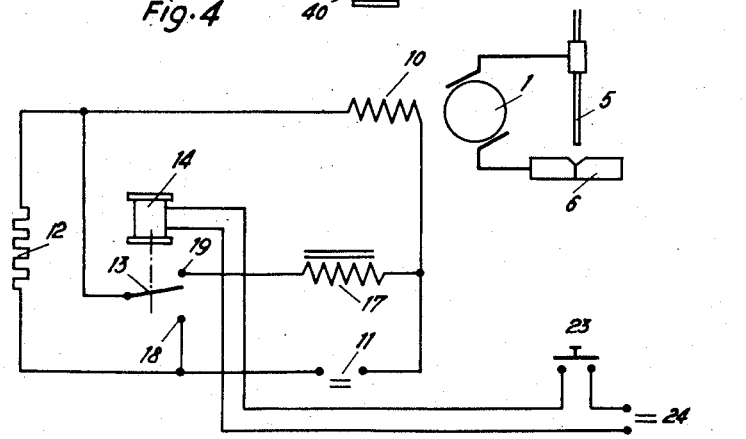
INVENTORS
PIERRE REGNAULD &
BORIS BOGATENKOFF
BY Young, Emery r Thompson
ATTYS.

2,897,343

METHOD AND APPARATUS FOR AUTOMATIC ARC WELDING WITH A FUSIBLE ELECTRODE

Pierre Regnauld, Le Vesinet, and Boris Bogatenkoff, Paris, France, assignors to L'Air Liquide, Societe Anonyme pour l'Etude et l'Exploitation de Procedes Georges Claude, Paris, France Application October 4, 1956, Serial No. 614,020

Claims priority, application France October 11, 1955

25 Claims. (Cl. 219—135)

Our invention is concerned with an improved method and apparatus for automatic arc welding with a fusible metal electrode. It is of interest more particularly for gas-shielded arc welding with a fusible electrode wire and with a high current density.

Our invention has for its main object to prevent the formation of a crater in the welding seam between successive welding operations, thereby avoiding the drawbacks due to the formation of such a crater, e.g. the production of cracks or flaws which appear more particularly in the case of certain light alloys at the end of a welding seam. These require, more particularly in the case of automatic welding, adding to the workpiece which is to be welded a tongue forming an extension of this workpiece upon which the weld is terminated.

In the conventional settings for gas shielded arc welding, a welding operation is terminated by simultaneously interrupting the electrode wire feed and the welding current. In the absence of any special provision, this manner of stopping a weld leads to the formation of a crater and it has furthermore the drawback of requiring the help of special arrangements for obtaining an instantaneous stop of the electrode wire feed, simultaneously with the interruption of the welding current. Conventional wire feeding devices show an inertia such that it is usually required, for obtaining a sufficiently rapid stop of the electrode wire simultaneously with the switching off of the welding current, to apply a sudden braking action or to resort to a comparatively complex and delicate declutching mechanism.

In the case of manual welding, the formation of a crater may be avoided by bringing the welding gun rearwardly over the welding seam which has already been laid. In the case of automatic welding, such a rearward movement would require a complex mechanism and a complementary operation would be necessary in any case for filling the crater.

It is obviously possible to remove the above disclosed drawbacks by resorting to a welding generator the voltage of which increases with the intensity; however, such a generator of the rising-characteristic type is comparatively expensive and its operation leads to particular operating conditions which restrict its scope of possible use.

Our invention allows, in contradistinction, the use of current sources operating under conventional conditions, i.e. producing a decreasing voltage when the intensity increases or producing a constant voltage, while cutting out the drawbacks referred to hereinabove.

Our invention brings an improvement to automatic arc welding methods operating with a fusible electrode, more particularly to gas shielded arc welding methods using a welding current source, the voltage of which under normal running conditions is constant or decreases as a function of intensity; the improvement according to our invention consists in causing the voltage and intensity of the welding current to decrease simultaneously together with the electrode feed rate at the end of a welding operation.

An advantageous result of this improved procedure is that it is no longer necessary to attempt a very quick stop of the electrode wire feed at the end of a welding operation, the extinction of the arc being prepared gradually during the slowing down period of the wire feed, in a manner such that the extinction is obtained approximately at the moment at which the wire feed rate drops down to zero. A first embodiment of this improvement is characterized by at least one of the following novel features:

The rate of decrease of the welding voltage during the slowing down of the electrode feed is adjusted so that the length of the arc remains substantially constant during the slowing down period.

The duration of the slowing down period of the electrode feed is adjusted so as to melt during this slowing down an amount of metal which is sufficient for filling the crater existing at the moment when the slowing down begins.

Maintaining a substantially constant arc length during the slowing down of the electrode until its final stop is of considerable importance and the most satisfactory operation is obtained when the voltage $U_0$ for which the arc becomes extinguished under an intensity approximating zero is reached at the very moment at which the speed of the electrode wire drops down to zero. According to our invention, the intensity of current is taken into account since the voltage $U_0$ for which the arc burns out is a function of the resistance of the arc gap which varies inversely to the intensity. Thus, for a same voltage of 29 volts, an arc of 6 mm. under an intensity of 400 amperes lengthens up to 10 mm. when said intensity drops down to 300 amperes. This lengthening continues when the intensity continues dropping so that for 100 amperes under the same voltage of 29 volts, the arc length may rise sometimes beyond 20 mm.

This phenomenon plays also a part in the difficulties known as "burn-back" appearing when the length of the arc increases too much and which are frequently the cause of damage to the nozzle guiding the electrode wire. The improvement according to our invention may be advantageously applied for suppressing such burn-back by providing means sensitive to the fluctuations of the arc, for instance a multiple relay, for controlling the gradual simultaneous reduction in the speed of progression of the electrode and also of the voltage and intensity of the welding current when the arc voltage rises beyond a predetermined value.

The adjustment of the slowing down of the electrode feed for filling the crater is defined practically in a comparatively easy manner by measuring the volume of this crater and by calculating the length of electrode wire required for filling said volume. By way of example, this wire length was of the order of a few ten centimeters during tests carried out by the applicants under conditions corresponding to the present conventional industrial practice. According to the intertia of the electrode feeding mechanism we may be constrained to increase or to reduce the duration of the slowing down period either through the agency of a fly-wheel incorporated in the mechanism if it slows down too abruptly or else by braking it through any suitable means.

An advantageous embodiment of our improved method is applicable when welding with a generator or more generally with a welding current source comprising a rotary machine. According to this embodiment, the energizing or field circuit of this machine is automatically controlled so as to provide for the simultaneous decrease of the voltage and of the intensity of the welding current during the slowing down period of the electrode feed.

This embodiment includes optionally at least one of the following features: At the beginning of the slowing down period of the electrode feed, a resistance is inserted in series in the energizing circuit of the generator. The value of this resistance is selected so that the time constant of the generator becomes matched to the duration of the slowing down period of the electrode feed. At the beginning of the slowing down period of the electrode feed, we insert a condenser and/or an inductance in parallel with the generator field winding. During the slowing down of the electrode, the field current of the generator is caused to decrease in a manner substantially proportional to electrode feed rate.

In the case where the welding current is supplied by a transformer which may be optionally followed by a rectifier, a further embodiment of our invention is characterized by the fact that we insert in series with the primary of the transformer a saturable reactor the saturating winding of which is supplied with a direct current sufficient for saturating this reactor under normal running conditions while said saturating current is caused to decrease at the moment when the electrode feed stopping control is actuated.

According to this same embodiment of our invention, it is of advantage to insert an inductance in parallel across the terminals of the arc at the moment of extinction of the arc so as to avoid an exaggerated increase of the open-circuit voltage between said terminals and to switch off the welding current at the moment at which the electrode feed rate drops down to zero. For this purpose, it is possible for instance to provide a delayed-action relay operated by the control means for stopping the electrode feed.

According to a further embodiment of our invention, the field current energizing the welding generator is caused to decrease during the slowing down period of the electrode wire at a rate substantially proportional to the speed of the electrode. This embodiment contemplates as a source of current for energizing the generator an amplifier controlled by a voltage which is substantially proportional to the speed of progression of the electrode. The switching off of the arc may be triggered either by the operator or, in the case of burn-back, through the arc voltage surge or again, in the case of a stoppage of the electrode wire, through an arrangement responsive to the wire motion or stoppage.

In yet another embodiment, the field current is controlled by an amplifier piloted by a tachometric generator driven by the electrode feed motor. This amplifier may be for instance of a magnetic or thyratron type. It may also be controlled by a voltage proportional to the voltage of the armature of the electrode feed motor.

We will now describe our invention with further detail, reference being made to the accompanying drawings given by way of example, in which:

Figure 4 is a further modification of Figure 1 according to which an inductance is connected during the stoppage in parallel with the field winding for a similar purpose.

Figure 5 is a diagram showing a welding plant in which the field current is controlled by an amplifier fed by a tachometric generator driven by the electrode wire feed motor.

Figure 6 is a diagram showing an arrangement in which a saturable reactor is inserted in series with the primary of a welding transformer and is associated with means for switching off the saturating current when welding is interrupted so as to gradually lower the arc voltage.

Figure 1:
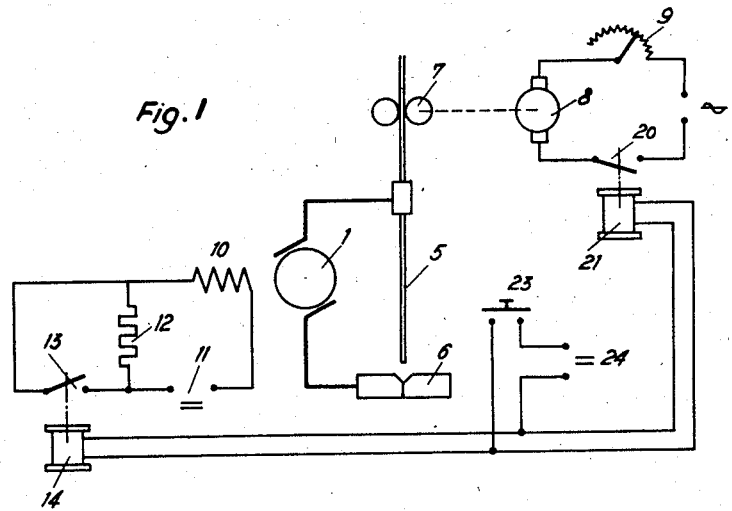
Figure 1 is a diagram of a welding circuit including a generator the output of which is adjustable at the moment of stopping a welding operation by inserting a resistance in series in its field circuit.

Turning to Figure 1, we have shown at 1 a welding generator connected with a fusible metal electrode 5 and with a workpiece to be welded 6. The electrode 5 is urged towards the workpiece 6 by rollers 7 driven by a motor 8. This motor is provided with speed-adjusting means 9; in the case of welding with a high current density, for which our invention is of particular interest, these adjusting means may simply consist in a rheostat as illustrated at 9 in Figure 1, since the use of a high current density allows generally, as well known in the art, feeding the electrode at a predetermined constant speed.

The generator 1 is provided with a field winding 10 which is energized in any suitable manner by a direct current source 11. This supply 11 may obviously be constituted in the usual manner by connecting the field winding in series, parallel or compound relationship with the rotor winding of the generator. Between the source 11 and the field winding 10 is inserted in series a resistance 12 across the terminals of which is connected a switch 13 which is normally closed during the welding period so as to short-circuit the resistance 12. This switch is actuated by a relay 14 energized by a current source 24. This relay 14 is preferably associated with a second relay 21 controlling a switch 20 adapted for opening the circuit energizing the electrode feed motor. The two relays 14 and 21 may thus be controlled in parallel through a common push button 23, the operation of which allows to stop the electrode feed while simultaneously and gradually decreasing the voltage and the intensity of the welding current.

Figure 2:
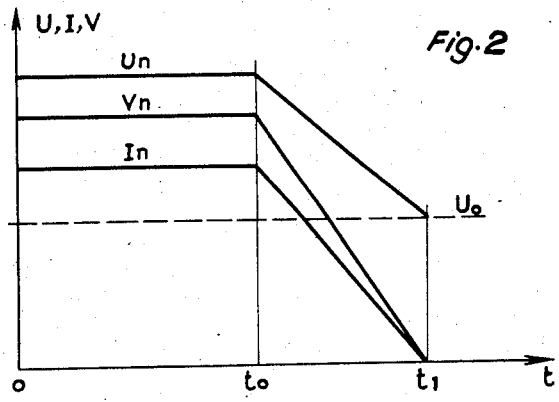
Figure 2 is a graph, in function of time, of the electrode feed rate, and of the welding current voltage and intensity during the termination of a welding operation in accordance with our invention.

Figure 2 illustrates by way of example the modifications with time $t$, of the three variables, welding voltage U, intensity I of the welding current and speed of progression V of the electrode.

On the left hand side of the line of ordinates $t_0$ which corresponds to the moment at which the operator depresses the push-button 23, the horizontal lines Un, Vn and In correspond respectively to the values of voltage, electrode speed and intensity during normal operation, which values are substantially constant. Between the ordinate $t_0$ and the ordinate $t_1$, which latter corresponds to the moment at which the electrode speed V drops to zero, there is provided, according to our invention, a gradual decrease of the voltage U and of the intensity I in a manner such that I drops to zero at the moment $t_0$ while at the same moment the voltage assumes a value $U_0$ which may be, for instance when welding steel, of the order of a dozen volts. This voltage $U_0$ is selected so that the spacing between the electrode 5 and the workpiece 6 may be substantially the same at the moment at which the progression of the electrode stops and at which the arc is extinguished, as during the welding operation under normal running conditions. In other words, we endeavor to obtain substantial coincidence between the curve showing the deceleration of the electrode and the curves showing the voltage and intensity of the welding current.

Through an adjustment of the value of the resistance 12 with reference to the self-inductance of the field winding 10, it is possible to control the duration of extinction of the arc so that it may match the time constant $L/R$ of the welding circuit.

In its simplest form as illustrated in Figure 1, our improved arrangement ensures a very gradual extinction of the arc under constant arc length conditions. It may however sometimes be advantageous, depending on the characteristic properties of the material used, to modify the law of variation of the arc voltage with time, by using one of the wiring diagrams illustrated in Figures 4 and 5.

Figure 3:
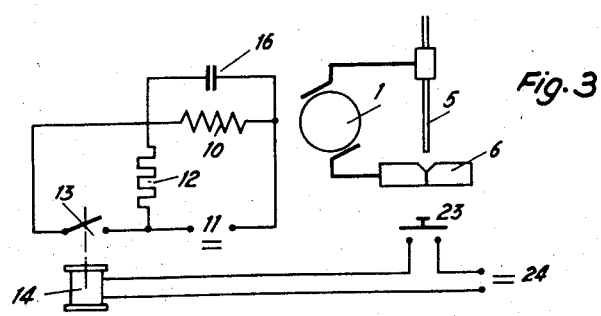
Figure 3 is a modification of Figure 1 wherein a condenser is connected in parallel with the field winding of the generator for adjusting the generator time constant.

In Figure 3, there is provided a condenser 16 shunting the terminals of the field winding 10 of the generator 1. This winding is energized, as in the case of Figure 1, by a source of current 11 through a resistance 12 which is short-circuited during the welding operation.

In Figure 4 an induction coil 17 is inserted in parallel with the field winding 10 at the moment of stopping a welding operation. A resistance 12 is inserted in series with the field winding in the manner already disclosed, when the coil 17 is inserted in parallel. To this end, the movable blade 13 of the relay 14 is adapted to occupy either an inoperative position engaging the contact-piece 18 during the welding operation so that the resistance 12 may be short-circuited and the winding 17 disconnected or an operative position engaging the contact-piece 19, when the relay 14 is energized. In the latter position, the resistance 12 forms a direct connection between the current supply 11 for energizing the generator and the junction point of the windings 10 and 17, the winding 17 being then in shunt relationship with the winding 10.

Figure 5 illustrates diagrammatically a welding system in which the electrode wire 5 is shown unwinding from a reel 25. The energizing current for the generator 1, flowing through the field winding 10, is adjusted in this particular embodiment through an amplifier 26 which is controlled by a variable voltage delivered by a tachometric generator 27 driven by the wire feed motor 8. The amplifier 26 may be of any suitable type such as a thyratron amplifier or a magnetic amplifier. It is also possible to use for the control of the amplifier 26 the armature voltage of the wire feed motor 8. In this case, as also in the case when a tachometric generator is being used, it is an easy matter to render the reduction in the voltage of the generator 1, substantially proportional to the reduction in the wire feed rate so as to obtain the extinction of the arc under constant arc length conditions, whatever may be the time required for stopping the wire feed.

In a more general manner, it is also possible, according to our invention, to provide an electronic arrangement such as a thyratron type amplifier or a magnetic amplifier for controlling the voltage of the generator in function of the welding current intensity, said arrangement being made inoperative during normal welding periods.

The diagram illustrated in Figure 6 illustrates a welding plant in which the welding current is supplied by a transformer 28. In accordance with our invention, a transducer 30 is inserted in series with the primary winding of said transformer 28; the transducer is normally saturated through a direct current passing through its control windings 32 so as to produce a negligible voltage drop during normal operation.

The control windings 32 are connected to a D.C. source 34 through a resistance 36 which is normally short-circuited by a switch 38 controlled by a relay 40. When a welding operation is being stopped, a push-button 23 connects an auxiliary current source 24 with the relay 40 and also with another relay 21 which controls the switch 20 in the circuit of the wire feed motor 8. It is also possible to connect in parallel with the two relays 21 and 40 a third relay 46 controlling a switch 44 adapted for connecting, as soon as a welding operation is being stopped, an induction coil 42 across the terminals of the arc, so as to prevent the open-circuit voltage across the terminals of the transformer from rising too high, which would objectionably affect the extinction of the arc. For the same purpose, it is also possible to provide a delayed relay for switching off the welding current after a period which is substantially equal to the time required by the electrode wire for stopping completely.

The arrangement of Figure 6 is also applicable to D.C. welding, in which case the transformer 26 is followed by a rectifier, not illustrated. In this case, the saturable reactance or transducer 30 might also be inserted between the transformer and the rectifier or again in the transformer primary circuit.

In all the arrangements described hereinabove, the control of the stoppage of the welding operation may be performed automatically through a voltage relay which operates as soon as the arc voltage rises beyond a predetermined safety value. This prevents any fortuitous burnback while a gradual stop is obtained under constant arc length conditions. This arrangement allows of stopping a welding operation by merely disconnecting the wire feed motor without using any contact breaker for the welding current.

The arrangement for stopping the welding operation in the case of a fortuitous stoppage of the electrode wire feed may consist in a contact-maker driven frictionally against the action of a spring by a small wheel driven by the welding wire. Said contact-maker may be for instance connected in parallel with that controlled by the push-button illustrated at 23.

What we claim is:

1. In an arc welding process using a fusible metal electrode fed automatically and a welding current source the voltage of which is constant or varies inversely to the intensity under normal welding conditions, a procedure for avoiding the formation of a crater in the welded seam when the electrode feed is slowed down, which comprises causing the voltage and intensity of the welding current to decrease gradually and simultaneously with the speed of electrode feed.

2. In an automatic arc welding process using a fusible metal electrode and a welding current source having a constant or dropping volt-ampere characteristic, the steps which consist in causing the voltage and amperage of the welding current to decrease gradually and simultaneously with the electrode feed speed at the end of a welding operation, whereby the formation of a crater in the welded seam may be avoided.

3. An arc welding method using automatic feed of a fusible metal electrode and a welding current source having a constant or dropping voltage characteristic, comprising the steps of gradually stopping the electrode feed at the end of a welding operation and causing the voltage and intensity of the welding current to decrease gradually and simultaneously with the electrode feed speed.

4. The method of claim 3, in which the welding current is reduced to zero simultaneously with the electrode feed speed.

5. The method of claim 3, in which the rate of decrease of the welding voltage is controlled for maintaining a substantially constant arc length while the electrode feed slows down to a standstill.

6. In an arc welding process using automatic feed of a fusible electrode wire and a welding current source having a constant or dropping voltage characteristic, the procedure which comprises gradually reducing to zero the electrode feed speed during a slow-down period at the end of a welding operation, causing the voltage and intensity parameters of the welding current to gradually decrease during said slow-down period and controlling the rate of decrease of the electrode feed speed in function of the rate of decrease of the welding current parameters for melting, during the said slow-down period, an amount of electrode wire sufficient for filling the crater normally present in the welded seam at the beginning of said slow-down period.

7. In an automatic arc welding method using automatic feed of a fusible metal electrode and a rotary generator having a field winding as a welding current source, the steps of controlling the current in said field winding while the electrode feed slows down to a standstill at the end of a welding operation so as to simultaneously decrease the voltage and intensity of the welding current during the deceleration of the electrode.

8. In an automatic arc welding method operating with a fusible metal electrode supplied with welding current by a rotary generator having a field winding, the steps consisting in slowing down the electrode feed at the end of a welding operation and inserting a resistance in series with the field winding of said generator so as to decrease simultaneously the voltage and intensity of the welding current during the deceleration of the electrode.

9. In an automatic arc welding method operating with a fusible metal electrode supplied with welding current by a rotary generator having a field winding, the steps consisting in slowing down the electrode feed at the end of a welding operation, inserting a resistance in series with the field winding of the generator so as to decrease simultaneously the voltage and intensity of the welding current during the deceleration of the electrode, the value of said resistance being adjusted for matching the time constant of the generator with the duration of the electrode deceleration from normal operative speed down to zero.

10. In an automatic arc welding method operating with a fusible metal electrode supplied with welding current by a rotary generator having a field winding, the steps consisting in slowing down the electrode feed at the end of a welding operation and inserting an impedance in parallel with the field winding of the generator for adjusting the energization of the rotary generator so as to decrease simultaneously the voltage and intensity of the welding current during the deceleration of the electrode.

11. The method of claim 10, in which the impedance inserted in parallel with the generator field winding is a capacitive impedance.

12. In an automatic welding arc method operating with a fusible metal electrode supplied with welding current by a rotary generator having a field winding, the steps consisting in slowing down the electrode feed at the end of a welding operation and reducing gradually the energizing current of the generator during the deceleration of the electrode proportionally to the said deceleration so as to decrease simultaneously the voltage and intensity of the welding current, the intensity being brought down to zero at the end of said deceleration.

13. An arc welding system comprising a welding current generator having a field winding, a motor adapted for feeding a fusible electrode wire towards a workpiece to be welded, a resistance in series with the field winding of said generator, a switch adapted to short-circuit said resistance when closed, a relay adapted for opening said switch, a second relay adapted to deenergize said motor, and means for simultaneously actuating said relays.

14. An arc welding system comprising a welding current generator having a field winding, a condenser in parallel with said winding, a motor adapted for feeding a fusible electrode wire towards a workpiece to be welded, a resistance in series with the field winding of the generator, a switch adapted to short-circuit said resistance, a relay controlling said switch, a second relay adapted to deenergize the motor, and means for simultaneously actuating said relays.

15. An arc welding system comprising a welding current generator having a field winding, an inductance inserted in parallel with said field winding, an electrode feed motor, a resistance in series with said inductance and said field winding of the generator, a double-throw relay adapted to short-circuit said resistance and to disconnect said inductance when energized, a second relay adapted to deenergize said motor, and means for simultaneously actuating said relays.

16. In an automatic arc welding system, means for feeding a fusible metal electrode towards a workpiece to be welded, a transformer including a primary and a secondary for supplying welding current to said electrode, a saturable reactor inserted in series with the transformer primary, said reactor including a control winding, means for supplying said control winding with direct current adapted to saturate the reactor during a welding operation, and means for gradually reducing said direct current and simultaneously slowing down the progression of said electrode down to zero to extinguish the welding arc at the end of a welding operation.

17. In an automatic arc welding system, means for driving a fusible metal electrode towards a workpiece to be welded, a transformer having a primary and a secondary winding for supplying welding current to said electrode, a saturable reactor in series with the transformer primary and including a control winding, means for supplying said control winding with a direct current adapted to saturate the reactor during a welding operation, an inductance adapted to be inserted across the arc gap between said electrode and said workpiece, and relays adapted for simultaneously reducing said direct current, inserting said inductance across the arc gap and slowing down the progression of the electrode down to zero to stop the welding arc.

18. In an automatic arc welding system, the combination of means for driving a fusible metal electrode towards a workpiece to be welded, a transformer having a primary and a secondary winding for supplying welding current to said electrode, a saturable reactor inserted in series with the transformer primary and including a saturating winding, means for supplying said saturating winding with a direct current adapted to saturate the reactor during a welding operation, means for gradually reducing said direct current and simultaneously slowing down the progression of the electrode down to zero to stop the welding arc, and means for switching off the welding current as soon as the electrode stops moving towards the workpiece to be welded.

19. In an automatic arc welding system, the combination of a device for feeding a fusible metal electrode towards a workpiece to be welded, a transformer including a primary and a secondary for supplying welding current to said electrode, a saturable reactor inserted in series with the transformer primary, said reactor having a control winding, means for supplying said control winding with a direct current adapted to saturate said reactor during a welding operation, means for simultaneously reducing said direct current and slowing down the progression of the electrode down to zero to stop the welding arc, and a delayed relay responsive to an interruption of the circuit energizing the electrode feed device for switching off the welding current.

20. In an automatic arc welding system, the combination of means for driving a fusible metal electrode towards a workpiece to be welded, means for supplying welding current to said electrode, means for gradually slowing down the electrode feed rate down to zero, and means for automatically decreasing the voltage and intensity of the welding current during the slowing down of said electrode for bringing said intensity down to zero when the electrode feed rate has dropped to zero.

21. In an automatic arc welding system, the combination of means for driving a fusible metal electrode towards a workpiece to be welded, means for supplying welding current to said electrode, and switching means responsive to at least one of the following conditions: (a) an abnormal rise of the arc voltage and (b) an accidental slow-down of the electrode feed, said means being operative for simultaneously decreasing the voltage and the intensity of the welding current whereby the welding arc becomes extinguished without forming a crater in the weld.

22. In an automatic arc welding system, the combination of means for driving a fusible metal electrode towards a workpiece to be welded, a generator for supplying welding current to said electrode, an amplifier for controlling the energization of said generator, means responsive to the speed of the electrode feed for producing a control voltage proportional to said speed for controlling said amplifier to reduce the voltage of the welding current and to bring its intensity to zero when the speed of progression of the electrode has dropped to zero.

23. In an automatic arc welding system, the combination of a motor for driving a fusible metal electrode towards a workpiece to be welded, a generator for supplying welding current to said electrode, an amplifier for controlling the energization of said generator, a tachometric dynamo driven by the electrode driving motor, the output of said dynamo being applied to said amplifier to reduce the output voltage of said generator and to bring the welding current to zero when the speed of progression of the electrode has dropped to zero.

24. In an automatic arc welding system, the combination of a motor having an armature for driving a fusible metal electrode towards a workpiece to be welded, a generator for supplying welding current to said electrode, an amplifier for controlling the energization of said generator, means for applying to said amplifier a control voltage proportional to the voltage in the armature of said motor for reducing the output voltage of said generator and bringing the welding current to zero when the speed of progression of the electrode has dropped to zero.

25. In an arc welding process using a fusible metal electrode fed automatically and subject to automatic travel relative to the work and a welding current source the voltage of which is constant or varies inversely to the intensity under normal welding conditions, a procedure for avoiding the formation of a crater in the welded seam when the electrode feed is slowed down, which comprises causing the voltage and intensity of the welding current to decrease gradually and simultaneously with the speed of electrode feed.

References Cited in the file of this patent
UNITED STATES PATENTS

| | | |
|---|---|---|
| 1,635,208 | Ezendam | July 12, 1927 |
| 1,701,372 | Jefts | Feb. 5, 1929 |
| 2,152,785 | Blankenbuehler | Apr. 4, 1939 |
| 2,239,577 | Serckx | Apr. 22, 1941 |
| 2,289,979 | Mann | July 14, 1942 |